United States Patent
Yoshida et al.

(10) Patent No.: US 10,793,650 B2
(45) Date of Patent: Oct. 6, 2020

(54) METHOD FOR PRODUCING LOW MOLECULAR WEIGHT POLYTETRAFLUOROETHYLENE, LOW MOLECULAR WEIGHT POLYTETRAFLUOROETHYLENE, AND POWDER

(71) Applicant: DAIKIN INDUSTRIES, LTD., Osaka-Shi, Osaka (JP)

(72) Inventors: Ken Yoshida, Osaka (JP); Hirotoshi Yoshida, Osaka (JP); Keisuke Hagi, Osaka (JP); Masayuki Tsuji, Osaka (JP); Taketo Kato, Osaka (JP); Yuuji Tanaka, Osaka (JP); Taku Yamanaka, Osaka (JP); Kazuya Kawahara, Osaka (JP); Masamichi Sukegawa, Osaka (JP); Kazutaka Hosokawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/696,970

(22) Filed: Nov. 26, 2019

(65) Prior Publication Data
US 2020/0123283 A1  Apr. 23, 2020

Related U.S. Application Data

(62) Division of application No. 16/069,052, filed as application No. PCT/JP2017/028484 on Aug. 4, 2017, now Pat. No. 10,538,605.

(30) Foreign Application Priority Data

Aug. 4, 2016 (JP) ................................. 2016-153857

(51) Int. Cl.
| | |
|---|---|
| C08F 2/46 | (2006.01) |
| C08F 2/50 | (2006.01) |
| C08G 61/04 | (2006.01) |
| C08F 8/50 | (2006.01) |
| C08J 3/28 | (2006.01) |
| C08K 5/01 | (2006.01) |
| C08K 5/03 | (2006.01) |

(52) U.S. Cl.
CPC ................... *C08F 8/50* (2013.01); *C08J 3/28* (2013.01); *C08K 5/01* (2013.01); *C08K 5/03* (2013.01); *C08F 2810/10* (2013.01); *C08J 2327/18* (2013.01); *C08J 2327/22* (2013.01)

(58) Field of Classification Search
CPC ...... C08F 8/50; C08F 2810/10; C08F 114/26; C08K 5/03; C08K 5/01; C08J 2327/22; C08J 2327/18; C08J 3/28; C08L 27/18
USPC ........... 522/79, 74, 71, 189, 184, 6, 1; 520/1
See application file for complete search history.

(56) References Cited

U.S. PATENT DOCUMENTS

| | | | |
|---|---|---|---|
| 3,838,030 A | 9/1974 | Kagiya et al. | |
| 5,891,573 A | 4/1999 | Neuberg et al. | |
| 2003/0153700 A1* | 8/2003 | Wu ........................ | B01D 69/10 |
| | | | 526/246 |
| 2009/0023856 A1 | 1/2009 | Nakatsuka et al. | |
| 2010/0314154 A1* | 12/2010 | Kitahara .............. | C09D 127/18 |
| | | | 174/110 SR |
| 2017/0008986 A1* | 1/2017 | Isaka ...................... | H01B 3/445 |
| 2019/0023856 A1 | 1/2019 | Yoshida et al. | |
| 2019/0040218 A1 | 2/2019 | Ikeda et al. | |

FOREIGN PATENT DOCUMENTS

| | | |
|---|---|---|
| CN | 102672968 A | 9/2012 |
| EP | 0 253 400 A2 | 1/1988 |
| JP | 47-19609 B | 6/1972 |
| JP | 51-3503 B2 | 2/1976 |
| JP | 48-78252 A | 10/1976 |
| JP | 52-25858 B2 | 7/1977 |
| JP | 63-146908 A | 6/1988 |
| JP | 2-220389 A | 9/1990 |
| JP | 10-77378 A | 3/1998 |
| JP | 10-147617 A | 6/1998 |
| JP | 2001-513579 A | 9/2001 |
| JP | 2002-531645 A | 9/2002 |
| JP | 4202595 B2 | 12/2008 |
| WO | 99/07549 A1 | 2/1999 |
| WO | 00/34300 A1 | 6/2000 |

OTHER PUBLICATIONS

Communication dated Jul. 11, 2019, issued by the U.S. Patent and Trademark Office in U.S. Appl. No. 16/069,735.
Communication dated May 10, 2019, from the European Patent Office in counterpart European Application No. 17837118.3.
Daikin, Polyflon PTFE F-104, Technical Data Sheet, 2015, 1 page total.

(Continued)

*Primary Examiner* — Jessica Whiteley
(74) *Attorney, Agent, or Firm* — Sughrue Mion, PLLC

(57) ABSTRACT

Low molecular weight polytetrafluoroethylene powder having a complex viscosity of $1 \times 10^2$ to $7 \times 10^5$ Pa·s at 380° C., containing 5 or less carboxyl groups at ends of the molecule chain per $10^6$ carbon atoms in the main chain, and being substantially free from C8-C14 perfluorocarboxylic acids and salts thereof. Also disclosed is a method for producing low molecular weight polytetrafluoroethylene.

2 Claims, No Drawings

(56) References Cited

OTHER PUBLICATIONS

Extended European Search Report dated May 10, 2019 issued by the European Patent Office in counterpart application No. 17837113.4.
International Preliminary Report on Patentability with English Translation of the Written Opinion of PCT/JP2017/028469 dated Feb. 5, 2019.
International Preliminary Report on Patentability with English Translation of the Written Opinion of PCT/JP2017/028484 dated Feb. 5, 2019.
International Search Report for PCT/JP2017/028469 dated Oct. 17, 2017 (PCT/ISA/210).
International Search Report for PCT/JP2017/028484 dated Oct. 17, 2017 (PCT/ISA/210).
Communication dated May 1, 2020, from the United States Patent and Trademark Office in related U.S. Appl. No. 16/069,735.
Shen Guang-lai et al., "Radiation Effect on Polytetrafluoroethylene Studied by ESR", Chinese Journal of Magnetic Resonance, vol. 28, No. 4, Dec. 2011 (13 pages total).
Communication dated Jun. 23, 2020, from the European Patent Office in related application No. 192175032.2.

\* cited by examiner

METHOD FOR PRODUCING LOW MOLECULAR WEIGHT POLYTETRAFLUOROETHYLENE, LOW MOLECULAR WEIGHT POLYTETRAFLUOROETHYLENE, AND POWDER

CROSS-REFERENCE TO RELATED APPLICATIONS

This application is a Rule 53(b) Divisional Application of U.S. application Ser. No. 16/069,052, filed on Jul. 10, 2018, which is a 371 of International Application No. PCT/JP2017/028484, filed on Aug. 4, 2017, which claims priority from Japanese Patent Application No. 2016-153857, filed on Aug. 4, 2016, the contents of all of which are incorporated herein by reference in their entirety.

TECHNICAL FIELD

The invention relates to methods for producing low molecular weight polytetrafluoroethylene, low molecular weight polytetrafluoroethylene, and powder.

BACKGROUND ART

Low molecular weight polytetrafluoroethylene (also referred to as "polytetrafluoroethylene wax" or "polytetrafluoroethylene micro powder") having a molecular weight of several thousands to several hundreds of thousands has excellent chemical stability and a very low surface energy, as well as low fibrillatability. Thus, low molecular weight polytetrafluoroethylene is used as an additive for improving the smoothness and the texture of film surfaces in production of articles such as plastics, inks, cosmetics, coatings, and greases (for example, see Patent Literature 1).

Examples of known methods for producing low molecular weight polytetrafluoroethylene include polymerization, radiolysis, and pyrolysis.

With regard to the radiolysis among these techniques, Patent Literature 2 discloses a method for producing polytetrafluoroethylene powder having an average particle size of 200 micrometers or smaller, including irradiating polytetrafluoroethylene powder or a preformed article or article thereof with ionizing radiation of at least $5\times10^3$ röntgen, and then pulverizing the irradiated article.

Patent Literature 3 discloses a method for providing a friable polytetrafluoroethylene product having particles of a desired size including a) maintaining a polytetrafluoroethylene starting material at below 18.89° C. (66° F.) during handling prior to irradiation; b) mixing the polytetrafluoroethylene starting material at below 18.89° C. (66° F.) with a wetting agent to provide a mixture; and c) irradiating at least a portion of the mixture to provide a wetted polytetrafluoroethylene product having particles of the desired size or being readily comminutable without agglomeration to particles of the desired size.

Patent Literature 4 discloses a method for producing polytetrafluoroethylene resin wax, including irradiating polytetrafluoroethylene resin with ionizing radiation in the presence of a gas mixture of an oxygen component and a halomethane.

CITATION LIST

Patent Literature

Patent Literature 1: JP H10-147617 A
Patent Literature 2: JP S47-19609 B
Patent Literature 3: JP 4202595 B
Patent Literature 4: JP S48-78252 B

SUMMARY OF INVENTION

Technical Problem

The inventors found that irradiation under conventional conditions unfortunately generates short-chain perfluorocarboxylic acids or salts thereof. The short-chain perfluorocarboxylic acids and salts thereof include non-naturally occurring, difficult-to-decompose substances which are further indicated to have high bioaccumulation, i.e., perfluorooctanoic acid containing 8 carbon atoms and salts thereof, perfluorononanoic acid containing 9 carbon atoms and salts thereof, and perfluorodecanoic acid containing 10 carbon atoms and salts thereof.

In view of the above current state of the art, the invention aims to provide a method for producing low molecular weight polytetrafluoroethylene less likely to generate C8-C14 perfluorocarboxylic acids and salts thereof.

Solution to Problem

The invention relates to a method for producing low molecular weight polytetrafluoroethylene, including:
(1) feeding into an airtight container: polytetrafluoroethylene; at least one additive selected from the group consisting of hydrocarbons, chlorinated hydrocarbons, alcohols, and carboxylic acids other than C8-C14 perfluorocarboxylic acids; and at least one selected from the group consisting of inert gases other than the above additive and oxygen adsorbents; and
(2) irradiating the polytetrafluoroethylene to provide low molecular weight polytetrafluoroethylene having a complex viscosity of $1\times10^2$ to $7\times10^5$ Pa·s at 380° C.

The inert gases each preferably have an oxygen content of 5.0 vol % or less.

In the step (2), the airtight container preferably contains substantially no oxygen.

The polytetrafluoroethylene preferably has a standard specific gravity of 2.130 to 2.230.

Both the polytetrafluoroethylene and the low molecular weight polytetrafluoroethylene are preferably in the form of powder.

The production method preferably further includes (3) heating the polytetrafluoroethylene up to a temperature that is not lower than the primary melting point thereof to provide a molded article before the step (1), the molded article having a specific gravity of 1.0 g/cm³ or higher.

The invention also relates to low molecular weight polytetrafluoroethylene obtainable by the above production method.

The invention also relates to powder containing low molecular weight polytetrafluoroethylene, the low molecular weight polytetrafluoroethylene having a complex viscosity of $1\times10^2$ to $7\times10^5$ Pa·s at 380° C. and containing 5 or less carboxyl groups at ends of the molecule chain per $10^6$ carbon atoms in the main chain, the powder being substantially free from C8-C14 perfluorocarboxylic acids and salts thereof.

The powder preferably satisfies that the perfluorocarboxylic acids and salts thereof amount to less than 25 ppb.

Advantageous Effects of Invention

The production method of the invention is less likely to generate C8-C14 perfluorocarboxylic acids and salts thereof.

DESCRIPTION OF EMBODIMENTS

The invention will be specifically described hereinbelow.

The production method of the present invention includes:

(1) feeding into an airtight container: polytetrafluoroethylene (PTFE); at least one additive selected from the group consisting of hydrocarbons, chlorinated hydrocarbons, alcohols, and carboxylic acids other than C8-C14 perfluorocarboxylic acids; and at least one selected from the group consisting of inert gases other than the above additive and oxygen adsorbents; and (2) irradiating the PTFE to provide low molecular weight PTFE having a complex viscosity of $1 \times 10^2$ to $7 \times 10^5$ Pa·s at 380° C. In the production method of the present invention, the presence of at least one selected from the group consisting of inert gases and oxygen adsorbents enables irradiation of the PTFE in an atmosphere with a low oxygen concentration, which is less likely to generate C8-C14 perfluorocarboxylic acids and salts thereof. Further, irradiation in an atmosphere with a low oxygen concentration usually has difficulty in providing low molecular weight PTFE. In contrast, the production method of the present invention includes irradiation in the presence of the additive(s), which enables production of low molecular weight PTFE even in an atmosphere with a low oxygen concentration.

The hydrocarbons are preferably C1-C20 saturated hydrocarbons. The carbon number is more preferably 5 or greater and 15 or smaller. Examples of the hydrocarbons include 3-methylpentane, n-hexane, and n-decane. Preferred are 3-methylpentane and n-hexane.

The chlorinated hydrocarbons are preferably chlorinated products of C1-C18 saturated hydrocarbons. The carbon number is more preferably 3 or greater and 16 or smaller. Examples of the chlorinated hydrocarbons include chloromethane and chloroethane. Preferred is chloroethane.

The alcohols are preferably C1-C12 monohydric saturated alcohols. The carbon number is more preferably 1 or greater and 10 or smaller. Examples of the alcohols include methanol, ethanol, and isopropyl alcohol. Preferred is ethanol.

The carboxylic acids are preferably C1-C13 saturated monocarboxylic acids other than C8-C14 perfluorocarboxylic acids. The carbon number is more preferably 2 or greater and 6 or smaller. Examples of the carboxylic acids include methanoic acid, ethanoic acid, and propanoic acid. Preferred are methanoic acid and ethanoic acid.

The additive is preferably at least one selected from the group consisting of hydrocarbons and alcohols.

The amount of the additive to be fed is preferably 0.001 to 10 mass %, more preferably 0.01 mass % or more, still more preferably 0.1 mass % or more, while more preferably 5 mass % or less, still more preferably 3 mass % or less, relative to the PTFE.

The inert gases each need to be a gas inert to a reaction of generating low molecular weight PTFE by irradiation. Examples of the inert gas include gases containing nitrogen, helium, argon, or the like other than the above additives. Preferred are gases containing nitrogen.

The inert gas preferably has an oxygen content of 5.0 vol % or less, more preferably 3.0 vol % or less, still more preferably 1.0 vol % or less. The lower limit thereof may be any value, and may be lower than the detection limit. With the inert gas having an oxygen content within the above range, irradiation of the PTFE in the step (2) is much less likely to generate C8-C14 perfluorocarboxylic acids and salts thereof.

The oxygen content can be checked using oxygen detection paper.

The oxygen adsorbents each may be any adsorbent capable of adsorbing oxygen. Examples thereof include known oxygen adsorbents, including inorganic oxygen adsorbents such as iron-based, zinc-based, or hydrosulfite-based adsorbents, and organic oxygen adsorbents such as ascorbic acid-based, polyhydric alcohol-based, or activated carbon-based adsorbents. The oxygen adsorbent may be of either a water-dependent type which requires water for a reaction with oxygen or self-reactive type which does not require water, and is preferably of a self-reactive type. The oxygen adsorbent is preferably an iron-based self-reactive oxygen adsorbent, quicklime, or the like, and is more preferably an iron-based self-reactive oxygen adsorbent.

The amount of the oxygen adsorbent to be fed is preferably such that the airtight container can have an oxygen concentration within the range to be mentioned later.

The airtight container herein means a container which can be sealed up so as to adjust the oxygen concentration in the airtight container. Thus, the airtight container may be coupled with pipes for intake and exhaust of the inert gas and for exhausting gas inside the airtight container, and may be coupled with components such as pipes, caps, valves, and flanges which are closed during irradiation. The airtight container may have any shape, such as a cylindrical shape, a prismatic shape, or a spherical shape, or may be a bag with a variable capacity. The container may be formed of any material, such as metal, glass, or a polymer. The airtight container needs not to be a pressure-resistant container.

The substances may be fed into the airtight container by, for example, a method in which the PTFE and the additive are placed in the airtight container, and then the airtight container is filled with the inert gas. In the case of using the oxygen adsorbent, examples of the feeding method include a method in which the PTFE, the additive, and the oxygen adsorbent are placed in the airtight container in the air atmosphere, and then the airtight container is sealed up; a method in which the PTFE, the additive, and the oxygen adsorbent are placed in the airtight container, and then the airtight container is filled with the inert gas; and a method in which the PTFE, the additive, and the oxygen adsorbent are placed in the airtight container, and then the airtight container is evacuated.

In the step (2), the PTFE can be irradiated by a conventionally known method under conventionally known conditions. Irradiation of the PTFE under conventional irradiating conditions generates low molecular weight PTFE having a lower complex viscosity than the PTFE, as well as C8-C14 perfluorocarboxylic acids and salts thereof. Generation of such perfluorocarboxylic acids and salts thereof can be reduced by the irradiation in the presence of the additive as well as at least one selected from the group consisting of the inert gases and the oxygen adsorbents. The step (2) is performed after the step (1).

In the step (2), the airtight container preferably contains substantially no oxygen. The phrase "contains substantially no oxygen" herein means that the oxygen concentration in the atmosphere inside the airtight container is 0.1 vol % or less.

The oxygen concentration can be determined by observing the color tone of an oxygen detection agent placed in the airtight container.

The condition where the airtight container contains substantially no oxygen can be achieved by adjusting the amount of at least one selected from the group consisting of the inert gases and the oxygen adsorbents to be fed into the airtight container as appropriate.

Examples of the radiation include any ionizing radiation, such as electron beams, ultraviolet rays, gamma rays, X-rays, neutron beams, and high energy ions. Electron beams or gamma rays are preferred.

The radiation preferably has an exposure dose of 1 to 2500 kGy, more preferably 1000 kGy or lower, still more preferably 750 kGy or lower, while more preferably 10 kGy or higher, still more preferably 100 kGy or higher.

The irradiation temperature may be any temperature within the range of 5° C. to the melting point of PTFE. It is known that the molecule chain of PTFE is crosslinked around the melting point thereof. The irradiation temperature is therefore preferably 320° C. or lower, more preferably 300° C. or lower, still more preferably 260° C. or lower, in order to provide low molecular weight PTFE. From an economic viewpoint, the irradiation is preferably performed at room temperature.

The production method of the invention may further include (3) heating the PTFE up to a temperature that is not lower than the primary melting point thereof to provide a molded article before the step (1). In this case, the molded article obtained in the step (3) can be used as the PTFE in the step (1). The primary melting point is preferably 300° C. or higher, more preferably 310° C. or higher, still more preferably 320° C. or higher. The primary melting point means the maximum peak temperature on an endothermic curve present on the crystal melting curve when unsintered PTFE is analyzed with a differential scanning calorimeter. The endothermic curve is obtainable by increasing the temperature at a temperature-increasing rate of 10° C./min using a differential scanning calorimeter.

The molded article in the step (3) preferably has a specific gravity of 1.0 g/cm$^3$ or higher, more preferably 1.5 g/cm$^3$ or higher, while preferably 2.5 g/cm$^3$ or lower.

The specific gravity can be determined by water displacement.

The production method of the invention may further include pulverizing the molded article to provide powder of the PTFE after the step (3). The molded article may be first coarsely and then finely pulverized.

The production method of the present invention may further include pulverizing the low molecular weight PTFE to provide a low molecular weight PTFE powder after the step (2).

The pulverization may be performed by any method, such as pulverization using a pulverizer. Examples of the pulverizer include impact-type pulverizers such as hammer mills, pin mills, and jet mills, and grinding-type pulverizers utilizing shearing force generated by unevenness between a rotary blade and a peripheral stator, such as cutter mills.

The pulverization temperature is preferably not lower than −200° C. but lower than 50° C. In the case of freeze pulverization, the pulverization temperature is usually −200° C. to −100° C. Still, the pulverization may be performed around room temperature (10° C. to 30° C.). Freeze pulverization is usually achieved by the use of liquid nitrogen, but such pulverization requires enormous equipment and high pulverization cost. In order to simplify the step and reduce the pulverization cost, the pulverization temperature is more preferably not lower than 10° C. but lower than 50° C., still more preferably 10° C. to 40° C., particularly preferably 10° C. to 30° C.

The pulverization may be followed by removal of fine particles and fibrous particles by air classification, and further followed by removal of coarse particles by classification.

In the air classification, the pulverized particles are sent to a cylindrical classification chamber by decompressed air and dispersed by swirl flow inside the chamber, and fine particles are classified by centrifugal force. The fine particles are collected from the central portion into a cyclone and a bag filter. Inside the classification chamber is provided a rotary device such as a circular-cone-like cone or rotor configured to achieve homogeneous gyrating movement of the pulverized particles and the air.

In the case of using a classification cone, the classification point is adjusted by controlling the volume of the secondary air or the gap from the classification cone. In the case of using a rotor, the air volume inside the classification chamber is adjusted by the number of rotations of the rotor.

Examples of the method of removing coarse particles include air classification, vibration sieving, and ultrasonic sieving with meshes. Air classification is preferred.

The production method of the present invention may further include heating the low molecular weight PTFE after the step (2). Even when C8-C14 perfluorocarboxylic acids or salts thereof are generated, such heating enables removal of the perfluorocarboxylic acids and salts thereof from the low molecular weight PTFE.

The heating is preferably performed at 50° C. to 300° C., for example. The heating temperature is more preferably 70° C. or higher, still more preferably 90° C. or higher, particularly preferably 100° C. or higher, while more preferably 230° C. or lower, still more preferably 200° C. or lower, particularly preferably 130° C. or lower.

The heating may be performed for any duration, and the heating duration is preferably 10 seconds to 5 hours, more preferably 5 minutes or longer, still more preferably 10 minutes or longer, while more preferably 4 hours or shorter, still more preferably 3 hours or shorter.

The heating may be performed by any method, such as methods using any of the following heating devices. Examples of the heating devices include box dryers, band dryers, tunnel dryers, nozzle jet dryers, moving-bed dryers, rotary dryers, fluidized-bed dryers, air-flow dryers, box dryers, disc dryers, cylindrical mixing dryers, inverted-cone mixing dryers, microwave devices, vacuum heaters, box electric furnaces, hot-air circulating devices, flash dryers, vibration dryers, belt dryers, extrusion dryers, and spray dryers.

The heating may be performed in any atmosphere. From the viewpoints of safety and economy, the heating is preferably performed in the air.

The heating may be performed by placing the low molecular weight PTFE in a heating furnace, increasing the temperature inside the heating furnace up to a predetermined temperature, and then leaving the PTFE for a predetermined period of time.

In the case of performing both the pulverization and the heating, the pulverization is preferably performed before the heating in order to easily remove C8-C14 perfluorocarboxylic acids and salts thereof. In this case, the pulverization may be again performed after the heating.

Next, the PTFE to be irradiated and the low molecular weight PTFE to be obtained after the irradiation in the production method of the invention are described hereinbelow.

The low molecular weight PTFE has a complex viscosity of $1 \times 10^2$ to $7 \times 10^5$ Pa·s at 380° C. The term "low molecular weight" herein means that the complex viscosity is within this range.

The complex viscosity is a value determined by the method used in the examples to be described later.

The PTFE to be irradiated preferably has a standard specific gravity (SSG) of 2.130 to 2.230. The standard specific gravity (SSG) is a value determined in conformity with ASTM D4895.

The PTFE has a significantly higher complex viscosity than the low molecular weight PTFE, and thus the complex viscosity thereof is difficult to measure accurately. In contrast, the complex viscosity of the low molecular weight PTFE is measurable, but the low molecular weight PTFE has difficulty in providing a molded article usable for measurement of standard specific gravity. Thus, the standard specific gravity thereof is difficult to measure accurately. Therefore, in the invention, the standard specific gravity is used as an indicator of the molecular weight of the PTFE to be irradiated, while the complex viscosity is used as an indicator of the molecular weight of the low molecular weight PTFE. For both the PTFE and the low molecular weight PTFE, no method for determining the molecular weight directly has been known so far.

The low molecular weight PTFE preferably has a melting point of 324° C. to 336° C.

The melting point is defined using a differential scanning calorimeter (DSC) as follows. Specifically, temperature calibration is performed in advance with indium and lead as standard samples. Then, about 3 mg of low molecular weight PTFE is put into an aluminum pan (crimped container), and the temperature is increased at a rate of 10° C./min within the temperature range of 250° C. to 380° C. under air flow at 200 ml/min. The minimum point of the heat of fusion within this region is defined as the melting point.

In the production method of the invention, the PTFE may be in any form, such as powder, a molded article of the PTFE, or shavings generated by cutting the molded article of the PTFE. The PTFE in the form of powder can easily provide powder of the low molecular weight PTFE.

The low molecular weight PTFE obtainable by the production method of the invention may be in any form, and is preferably in the form of powder.

When the low molecular weight PTFE obtainable by the production method of the invention is in the form of powder, the specific surface area thereof is preferably 0.5 to 20 $m^2/g$.

For the low molecular weight PTFE powder, both of the following two types are demanded, i.e., a small specific surface area type having a specific surface area of not smaller than 0.5 $m^2/g$ but smaller than 7.0 $m^2/g$ and a large specific surface area type having a specific surface area of not smaller than 7.0 $m^2/g$ and not larger than 20 $m^2/g$.

The low molecular weight PTFE powder of a small specific surface area type has an advantage of easy dispersion in a matrix material such as coating. In contrast, such powder disperses in a matrix material with a large dispersed particle size, i.e., with poor fine dispersibility.

The low molecular weight PTFE powder of a small specific surface area type preferably has a specific surface area of 1.0 $m^2/g$ or larger, while preferably 5.0 $m^2/g$ or smaller, more preferably 3.0 $m^2/g$ or smaller. Suitable examples of the matrix material include plastics and inks, as well as coatings.

The low molecular weight PTFE powder of a large specific surface area type, when dispersed in a matrix material such as coating, has advantages of high surface-modifying effects, such as a small dispersed particle size in a matrix material and improved texture of the film surface, and a large amount of oil absorption. In contrast, such powder may not be easily dispersed in a matrix material (e.g., take a long time for dispersion), and may cause an increased viscosity of coating, for example.

The low molecular weight PTFE powder of a large specific surface area type preferably has a specific surface area of 8.0 $m^2/g$ or larger, while preferably 15 $m^2/g$ or smaller, more preferably 13 $m^2/g$ or smaller. Suitable examples of the matrix material include oils, greases, and coatings, as well as plastics.

The specific surface area is determined by the BET method using a surface analyzer (trade name: BELSORP-mini II, MicrotracBEL Corp.), a gas mixture of 30% nitrogen and 70% helium as carrier gas, and liquid nitrogen for cooling.

When the low molecular weight PTFE obtainable by the production method of the invention is in the form of powder, the average particle size thereof is preferably 0.5 to 200 μm, more preferably 20 μm or smaller, still more preferably 10 μm or smaller, particularly preferably 5 μm or smaller. As mentioned here, powder having a relatively small average particle size, when used as an additive for coating, for example, can provide a film having much better surface smoothness.

The average particle size is equivalent to the particle size corresponding to 50% of the cumulative volume in the particle size distribution determined using a laser diffraction particle size distribution analyzer (HELOS & RODOS) available from Jeol Ltd. at a dispersive pressure of 3.0 bar without cascade impaction.

The production method of the invention can provide low molecular weight PTFE containing hardly any C8-C14 perfluorocarboxylic acids and salts thereof after the step (2). The low molecular weight PTFE obtainable by the production method of the invention preferably contains C8-C14 perfluorocarboxylic acids and salts thereof in a total amount by mass of not more than 50 ppb, more preferably less than 25 ppb, still more preferably not more than 15 ppb, particularly preferably not more than 5 ppb, most preferably less than 5 ppb. The lower limit of the amount may be any value, and may be lower than the detection limit.

The amount of the perfluorocarboxylic acids and salts thereof can be determined by liquid chromatography.

The low molecular weight PTFE obtainable by the production method of the invention is also characterized in that it contains hardly any perfluorooctanoic acid and salts thereof. The low molecular weight PTFE obtainable by the production method of the invention preferably contains perfluorooctanoic acid and salts thereof in an amount by mass of less than 25 ppb, more preferably not more than 10 ppb, still more preferably not more than 5 ppb, particularly preferably less than 5 ppb. The lower limit may be any value, and may be lower than the detection limit.

The amount of perfluorooctanoic acid and salts thereof can be determined by liquid chromatography.

The invention also relates to low molecular weight PTFE obtainable by the aforementioned production method. The low molecular weight PTFE of the invention contains hardly any C8-C14 perfluorocarboxylic acids and salts thereof. The low molecular weight PTFE of the invention preferably contains C8-C14 perfluorocarboxylic acids and salts thereof in a total amount by mass of not more than 50 ppb, more preferably less than 25 ppb, still more preferably not more than 15 ppb, particularly preferably not more than 5 ppb, most preferably less than 5 ppb. The lower limit thereof may be any value, and may be lower than the detection limit.

The low molecular weight PTFE of the invention preferably contains perfluorooctanoic acid and salts thereof in an amount by mass of less than 25 ppb, more preferably not more than 10 ppb, still more preferably not more than 5 ppb, particularly preferably less than 5 ppb. The lower limit thereof may be any value, and may be lower than the detection limit.

The low molecular weight PTFE of the invention may be in any form, and is preferably in the form of powder.

When the low molecular weight PTFE of the invention is in the form of powder, the specific surface area thereof is preferably 0.5 to 20 m$^2$/g.

When the low molecular weight PTFE of the invention is in the form of powder, the average particle size thereof is preferably 0.5 to 200 μm, more preferably 20 μm or smaller, still more preferably 10 μm or smaller, particularly preferably 5 μm or smaller. As mentioned here, powder having a relatively small average particle size, when used as an additive for coating, for example, can provide a film having much better surface smoothness.

The low molecular weight PTFE preferably contains 5 or less carboxyl groups at ends of the molecule chain per 10$^6$ carbon atoms in the main chain. The number of carboxyl groups is more preferably 4 or less, still more preferably 3 or less, per 10$^6$ carbon atoms in the main chain. The lower limit thereof may be any value, and may be lower than the detection limit.

The number of carboxyl groups is a value determined by the method used in the examples to be described later. The detection limit of this measurement method is 0.5.

The low molecular weight PTFE may contain, at ends of the molecule chain, unstable end groups derived from the chemical structure of a polymerization initiator or chain-transfer agent used in the polymerization reaction of PTFE. Examples of the unstable end groups include, but are not limited to, —CH$_2$OH, —COOH, and —COOCH$_3$.

The low molecular weight PTFE may undergo stabilization of the unstable end groups. The unstable end groups may be stabilized by any method, such as a method of exposing the unstable end groups to fluorine-containing gas to convert them into trifluoromethyl groups (—CF$_3$), for example.

The low molecular weight PTFE may contain amidated ends. The end amidation may be performed by any method, such as a method of bringing fluorocarbonyl groups (—COF) obtained by exposure to fluorine-containing gas into contact with ammonia gas as disclosed in JP H04-20507 A, for example.

The low molecular weight PTFE with stabilization or end amidation of the unstable end groups as described above can be well compatible with opposite materials and have improved dispersibility when used as an additive for opposite materials such as coatings, greases, cosmetics, plating solutions, toners, and plastics.

The PTFE may be a homo-PTFE consisting only of a tetrafluoroethylene (TFE) unit or may be a modified PTFE containing a TFE unit and a modifying monomer unit based on a modifying monomer copolymerizable with TFE. In the production method of the invention, the composition of the polymer is not changed. Thus, the low molecular weight PTFE has the composition of the PTFE as it is.

In the modified PTFE, the proportion of the modifying monomer unit is preferably 0.001 to 1 mass %, more preferably 0.01 mass % or more, while more preferably 0.5 mass % or less, still more preferably 0.1 mass % or less, of all the monomer units. The term "modifying monomer unit" herein means a moiety that is part of the molecular structure of the modified PTFE and is derived from a modifying monomer. The term "all the monomer units" herein means all the moieties derived from monomers in the molecular structure of the modified PTFE. The proportion of the modifying monomer unit can be determined by any known method such as Fourier transform infrared spectroscopy (FT-IR).

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkylethylenes; and ethylene. One modifying monomer may be used, or multiple modifying monomers may be used.

Examples of the perfluorovinyl ether include, but are not limited to, unsaturated perfluoro compounds represented by the following formula (1):

$$CF_2=CF—ORf \qquad (1)$$

wherein Rf is a perfluoroorganic group. The "perfluoroorganic group" herein means an organic group in which all the hydrogen atoms bonded to any carbon atom are replaced by fluorine atoms. The perfluoroorganic group may contain ether oxygen.

Examples of the perfluorovinyl ether include perfluoro (alkyl vinyl ethers) (PAVEs) represented by the formula (1) in which Rf is a C1-C10 perfluoroalkyl group. The perfluoroalkyl group preferably contains 1 to 5 carbon atoms.

Examples of the perfluoroalkyl group in the PAVE include perfluoromethyl, perfluoroethyl, perfluoropropyl, perfluorobutyl, perfluoropentyl, and perfluorohexyl groups. Preferred is perfluoro(propyl vinyl ether) (PPVE) in which the perfluoroalkyl group is a perfluoropropyl group.

Examples of the perfluorovinyl ether also include those represented by the formula (1) in which Rf is a C4-C9 perfluoro(alkoxyalkyl) group, those represented by the formula (1) in which Rf is a group represented by the following formula:

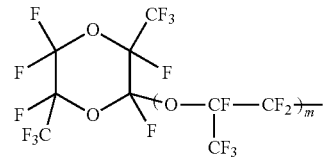

[Chem. 1]

(wherein m is 0 or an integer of 1 to 4), and those represented by the formula (1) in which Rf is a group represented by the following formula:

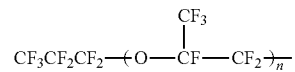

[Chem. 2]

wherein n is an integer of 1 to 4.

Examples of the perfluoroalkylethylenes include, but are not limited to, (perfluorobutyl)ethylene (PFBE), (perfluorohexyl)ethylene, and (perfluorooctyl)ethylene.

The modifying monomer in the modified PTFE is preferably at least one selected from the group consisting of HFP, CTFE, VDF, PPVE, PFBE, and ethylene. It is more preferably at least one selected from the group consisting of HFP and CTFE.

The invention also relates to powder containing low molecular weight PTFE, the low molecular weight PTFE having a complex viscosity of $1 \times 10^2$ to $7 \times 10^5$ Pa·s at 380° C. and containing 5 or less carboxyl groups at ends of the molecule chain per $10^6$ carbon atoms in the main chain, the powder being substantially free from C8-C14 perfluorocarboxylic acids and salts thereof.

The powder of the invention is substantially free from C8-C14 perfluorocarboxylic acids and salts thereof. The phrase "substantially free from C8-C14 perfluorocarboxylic acids and salts thereof" herein preferably means that the powder contains C8-C14 perfluorocarboxylic acids and salts thereof in a total amount by mass of not more than 50 ppb. The total amount thereof is more preferably less than 25 ppb, still more preferably not more than 15 ppb, particularly preferably not more than 5 ppb, most preferably less than 5 ppb. The lower limit thereof may be any value, and may be lower than the detection limit.

The powder of the invention preferably contains perfluorooctanoic acid and salts thereof in a total amount by mass of less than 25 ppb, more preferably not more than 10 ppb, still more preferably not more than 5 ppb, particularly preferably less than 5 ppb. The lower limit thereof may be any value, and may be lower than the detection limit.

The powder of the invention preferably has a specific surface area of 0.5 to 20 m²/g.

The powder of the invention preferably has an average particle size of 0.5 to 200 μm, more preferably 20 μm or smaller, still more preferably 10 μm or smaller, particularly preferably 5 μm or smaller. As mentioned here, powder having a relatively small average particle size, when used as an additive for coating, for example, can provide a film having much better surface smoothness.

For the low molecular weight PTFE constituting the powder of the invention, the composition, complex viscosity, and specifications of carboxyl groups at ends of the molecule chain are similar to those described for the low molecular weight PTFE obtainable by the production method of the invention.

The low molecular weight PTFE constituting the powder of the invention may contain unstable end groups at ends of the molecule chain, and these unstable end groups may be stabilized or end-amidated. These embodiments are also similar to those described for the low molecular weight PTFE obtainable by the production method of the invention.

The powder of the invention may be obtainable by producing powdery low molecular weight PTFE by the aforementioned production method of the invention.

The low molecular weight PTFE and the powder can suitably be used as molding materials, inks, cosmetics, coatings, greases, components for office automation devices, additives for modifying toners, and additives for plating solutions, for example. Examples of the molding materials include engineering plastics such as polyoxybenzoyl polyester, polyimide, polyamide, polyamide-imide, polyacetal, polycarbonate, and polyphenylene sulfide. The low molecular weight PTFE is particularly suitable as a thickening agent for greases.

The low molecular weight PTFE and the powder can suitably be used as additives for molding materials for improving the non-adhesiveness and slidability of rollers of copiers, for improving the texture of molded articles of engineering plastics, such as surface sheets of furniture, dashboards of automobiles, and covers of home appliances, and for improving the smoothness and abrasion resistance of machine elements generating mechanical friction, such as light-load bearings, gears, cams, buttons of push-button telephones, movie projectors, camera components, and sliding materials, and processing aids for engineering plastics, for example.

The low molecular weight PTFE and the powder can be used as additives for coatings for the purpose of improving the smoothness of varnish and paint. The low molecular weight PTFE and the powder can be used as additives for cosmetics for the purpose of improving the smoothness of cosmetics such as foundation.

The low molecular weight PTFE and the powder can also be suitably used for improving the oil or water repellency of wax and for improving the smoothness of greases and toners.

The low molecular weight PTFE and the powder can be used as electrode binders of secondary batteries and fuel cells, hardness adjusters for electrode binders, and water repellents for electrode surfaces.

The low molecular weight PTFE or the powder may be combined with a lubricant to provide grease. The grease is characterized by containing the low molecular weight PTFE or the powder and a lubricant. Thus, the low molecular weight PTFE or the powder is uniformly and stably dispersed in the lubricant and the grease exhibits excellent performance such as load resistance, electric insulation, and low moisture absorption.

The lubricant (base oil) may be either mineral oil or synthetic oil. Examples of the lubricant (base oil) include paraffinic or naphthenic mineral oils, and synthetic oils such as synthetic hydrocarbon oils, ester oils, fluorine oils, and silicone oils. In terms of heat resistance, fluorine oils are preferred. Examples of the fluorine oils include perfluoropolyether oil and polychlorotrifluoroethylene with a low polymerization degree. The polychlorotrifluoroethylene with a low polymerization degree may have a weight average molecular weight of 500 to 1200.

The grease may further contain a thickening agent. Examples of the thickening agent include metal soaps, composite metal soaps, bentonite, phthalocyanin, silica gel, urea compounds, urea/urethane compounds, urethane compounds, and imide compounds. Examples of the metal soaps include sodium soap, calcium soap, aluminum soap, and lithium soap. Examples of the urea compounds, urea/urethane compounds, and urethane compounds include diurea compounds, triurea compounds, tetraurea compounds, other polyurea compounds, urea/urethane compounds, diurethane compounds, and mixtures thereof.

The grease preferably contains the low molecular weight PTFE or the powder in an amount of 0.1 to 50 mass %, more preferably 0.5 mass % or more and 30 mass % or less. A grease containing too large an amount of the low molecular weight PTFE or powder may be too hard to provide sufficient lubrication. A grease containing too small an amount of the low molecular weight PTFE or powder may fail to exert the sealability.

The grease may also contain any of additives such as solid lubricants, extreme pressure agents, antioxidants, oiliness agents, anticorrosives, viscosity index improvers, and detergent dispersants. EXAMPLES The invention is described below with reference to examples. Still, the invention is not intended to be limited to the following examples.

The parameters in the examples were determined by the following methods.
Complex Viscosity About 0.3 g of powdery PTFE was put into a cylindrical mold having an inner diameter of 8 mm and pressurized. Thereby, a disc-shaped molded article (diameter: 8 mm, thickness: about 3 mm) was obtained as a sample.

The sample was sandwiched between 10-mm-diameter parallel plates on a test stand of "Rheometer MCR500" (Anton Paar GmbH). The sample was maintained in the sandwiched state at 380° C. for five minutes. Then, the distance between the plates was adjusted to 1.5 mm and the complex viscosity at 380° C. was measured in an oscillation mode at a deformation in measurement of 15% and a shearing rate of 0.01 (1/s).

In the case of parallel plates, the deformation in measurement means the ratio of the oscillating amplitude of a parallel plate at the outermost circumference to the sample thickness.

Number of Carboxyl End Groups

The following measurement was performed in conformity with the method of analyzing end groups disclosed in JP H04-20507 A.

Low molecular weight PTFE powder was preformed with a hand press to provide a film having a thickness of about 0.1 mm. The resulting film was subjected to infrared absorption spectrum analysis. PTFE with completely fluorinated ends by contact with fluorine gas was also subjected to infrared absorption spectrum analysis. Based on the difference spectrum therebetween, the number of carboxyl end groups was calculated by the following formula.

Number of carboxyl end groups (per $10^6$ carbon atoms)=$(l \times K)/t$ l: absorbance
K: correction coefficient
t: film thickness (mm)

The absorption frequency and correction coefficient of the carboxyl group are respectively set to 3560 cm$^{-1}$ and 440.

Amount of Perfluorooctanoic Acid and Salts Thereof

The amount of perfluorooctanoic acid and salts thereof was determined using a liquid chromatography-mass spectrometer (LC-MS ACQUITY UPLC/TQD, Waters). Measurement powder (1 g) was mixed with acetonitrile (5 ml) and the mixture was sonicated for 60 minutes, so that perfluorooctanoic acid was extracted. The resulting liquid phase was analyzed by multiple reaction monitoring (MRM). Acetonitrile (A) and an aqueous ammonium acetate solution (20 mmol/L) (B) were passed at a predetermined concentration gradient (A/B=40/60 for 2 min and 80/20 for 1 min) as mobile phases. A separation column (ACQUITY UPLC BEH C18 1.7 μm) was used at a column temperature of 40° C. and an injection volume of 5 μL. Electrospray ionization (ESI) in a negative mode was used as the ionization method, and the cone voltage was set to 25 V. The ratio of the molecular weight of precursor ions to the molecular weight of product ions was measured to be 413/369. The amount of perfluorooctanoic acid and salts thereof was calculated by the external standard method. The detection limit of this measurement is 5 ppb.

Amount of C8-C14 Perfluorocarboxylic Acids and Salts Thereof

C8-C14 perfluorocarboxylic acids and salts thereof were detected using a liquid chromatography-mass spectrometer (LC-MS ACQUITY UPLC/TQD, Waters). The solution used was the liquid phase extracted in the measurement of perfluorooctanoic acid, and the measurement was performed by MRM. The measurement conditions were based on the measurement conditions for perfluorooctanoic acid, but the concentration gradient was changed (A/B=10/90 for 1.5 min and 90/10 for 3.5 min). The ratio of the molecular weight of precursor ions to the molecular weight of product ions was measured to be 413/369 for perfluorooctanoic acid (C8), 463/419 for perfluorononanoic acid (C9), and 513/469 for perfluorodecanoic acid (C10).

The total amount of C8-C14 perfluorocarboxylic acids was calculated from the amount (X) of the perfluorooctanoic acid obtained in the above measurement by the following formula. The detection limit of this measurement is 5 ppb.

$(A_{C8}+A_{C9}+A_{C10})/A_{C8} \times X$ $A_{C8}$: peak area of perfluorooctanoic acid
$A_{C9}$: peak area of perfluorononanoic acid
$A_{C10}$: peak area of perfluorodecanoic acid X: amount of perfluorooctanoic acid calculated from the MRM measurement result by the external standard method Oxygen Concentration in Airtight Container The color tone of oxygen detection paper enclosed in the airtight container was observed to change from blue to pink, which demonstrated that the oxygen concentration was 0.1 vol % or less (oxygen was absent).

Example 1

A barrier nylon bag was charged with 100 g of PTFE fine powder (standard specific gravity determined in conformity with ASTM D4895: 2.175), with 2.34 g of ethanol added as an additive.

An iron-based self-reactive oxygen adsorbent (oxygen detection paper-integrated AGELESS, Mitsubishi Gas Chemical Co., Inc.) serving as an oxygen adsorbent was further enclosed in the bag. The barrier nylon bag was then heat-sealed. The absence of oxygen was confirmed with the oxygen detection paper, and then the PTFE fine powder in the bag was irradiated with 150 kGy of cobalt-60γ rays at room temperature. Thereby, a low molecular weight PTFE powder was obtained. The physical properties of the resulting low molecular weight PTFE powder were determined. The results are shown in Table 1.

Example 2

A low molecular weight PTFE powder was obtained in the same manner as in Example 1 except that 1.95 g of n-hexane was added as an additive instead of ethanol.

The physical properties of the resulting low molecular weight PTFE powder were determined in the same manner as in Example 1. The results are shown in Table 1.

Example 3

A low molecular weight PTFE powder was obtained in the same manner as in Example 1 except that 1.98 g of 3-methylpentane was added as an additive instead of ethanol.

The physical properties of the resulting low molecular weight PTFE powder were determined in the same manner as in Example 1. The results are shown in Table 1.

Comparative Example 1

A low molecular weight PTFE powder was obtained in the same manner as in Example 1 except that ethanol was not added.

The physical properties of the resulting low molecular weight PTFE powder were determined in the same manner as in Example 1. The results are shown in Table 1.

Comparative Example 2

The same barrier nylon bag as in Example 1 was charged with 100 g of the same PTFE fine powder as in Example 1 alone, and then heat-sealed.

The PTFE fine powder in the bag was irradiated with 150 kGy of cobalt-60γ rays at room temperature. Thereby, a low molecular weight PTFE powder was obtained.

The physical properties of the resulting low molecular weight PTFE powder were determined in the same manner as in Example 1. The results are shown in Table 1.

Example 4

The same barrier nylon bag as in Example 1 was charged with 100 g of the same PTFE fine powder as in Example 1, with 2.34 g of ethanol added as an additive. The inside of the bag was purged with nitrogen gas 10 times so that the atmosphere in the bag was made to be a nitrogen atmosphere. The bag was then heat-sealed. The oxygen concentration in the inert gas for purging was 50 ppm.

The absence of oxygen was confirmed with the oxygen detection paper placed in the bag in advance, and then the PTFE fine powder in the bag was irradiated with 150 kGy of cobalt-60γ rays. Thereby, a low molecular weight PTFE powder was obtained.

The physical properties of the resulting low molecular weight PTFE powder were determined in the same manner as in Example 1. The results are shown in Table 1.

Reference Example 1

A low molecular weight PTFE powder was obtained by emulsion polymerization in the presence of a chain-transfer agent in accordance with Example 2 of WO 2009/020187. For the resulting low molecular weight PTFE powder, the number of carboxyl end groups was counted by infrared spectroscopy to be 7 groups per $10^6$ carbon atoms in the main chain.

Reference Example 2

A low molecular weight PTFE powder was obtained by emulsion polymerization in the presence of a chain-transfer agent in accordance with Preparation Example 2 of JP H08-339809 A, except that the amount of ethane added as a chain-transfer agent was changed to 0.22 g. For the resulting low molecular weight PTFE powder, the number of carboxyl end groups was counted by infrared spectroscopy to be 15 groups per $10^6$ carbon atoms in the main chain.

TABLE 1

|  | Example 1 | Example 2 | Example 3 | Comparative Example 1 | Comparative Example 2 | Example 4 |
|---|---|---|---|---|---|---|
| Additive | Ethanol | n-Hexane | 3-Methylpentane | — | — | Ethanol |
| Deoxidation method | Oxygen adsorbent | Oxygen adsorbent | Oxygen adsorbent | Oxygen adsorbent | — | Nitrogen purging |
| Amount of PFC (ppb) | <5 | <5 | <5 | <5 | 335 | <5 |
| Amount of PFOA (ppb) | <5 | <5 | <5 | <5 | 106 | <5 |
| Complex viscosity at 380° C. (Pa · s) | $6.3 \times 10^5$ | $5.2 \times 10^5$ | $4.0 \times 10^5$ | $8.0 \times 10^5$ | $1.9 \times 10^5$ | $6.6 \times 10^5$ |
| Carboxyl end groups (N) | 2.9 | 2.0 | 2.4 | 2.5 | 36.2 | 2.3 |

The abbreviations in the tables represent as follows.
PFC: C8-C14 perfluorocarboxylic acids and salts thereof
PFOA: perfluorooctanoic acid and salts thereof

What is claimed is:

1. Powder comprising low molecular weight polytetrafluoroethylene,
   the low molecular weight polytetrafluoroethylene having a complex viscosity of $1 \times 10^2$ to $7 \times 10^5$ Pa·s at 380° C. and containing 5 or less carboxyl groups at ends of the molecule chain per $10^6$ carbon atoms in the main chain,
   the powder being substantially free from C8-C14 perfluorocarboxylic acids and salts thereof,
   wherein the low molecular weight polytetrafluoroethylene (i) consists of a tetrafluoroethylene (TFE) unit or (ii) comprises a TFE unit and of all the monomer units, 0.001 to 1 mass % of a modifying monomer unit based on a modifying monomer copolymerizable with TFE.

2. The powder according to claim 1, wherein the perfluorocarboxylic acids and salts thereof amount to less than 25 ppb.

* * * * *